(12) United States Patent
Raj (10) Patent No.: US 8,531,195 B2
(45) Date of Patent: Sep. 10, 2013

(54) FAILURE INDICATOR SEAL FOR A ROTARY FEEDTHROUGH

(75) Inventor: Kuldip Raj, Merrimack, NH (US)

(73) Assignee: Ferrotec (USA) Corporation, Santa Clara, CA (US)

( * ) Notice: Subject to any disclaimer, the term of this patent is extended or adjusted under 35 U.S.C. 154(b) by 425 days.

(21) Appl. No.: 12/869,065

(22) Filed: Aug. 26, 2010

(65) Prior Publication Data

US 2012/0049871 A1 Mar. 1, 2012

(51) Int. Cl.
*G01R 27/08* (2006.01)

(52) U.S. Cl.
USPC ........................................ 324/722

(58) Field of Classification Search
USPC ........................................ 324/722
See application file for complete search history.

(56) References Cited

U.S. PATENT DOCUMENTS

| | | | |
|---|---|---|---|
| 3,864,960 A * | 2/1975 | Fletcher et al. ................ | 73/46 |
| 4,357,022 A | 11/1982 | Raj | |
| 4,357,024 A | 11/1982 | Raj | |
| 4,502,700 A | 3/1985 | Gowda et al. | |
| 4,506,895 A | 3/1985 | Raj | |
| 4,526,379 A * | 7/1985 | Raj ................................ | 277/410 |
| 4,527,805 A * | 7/1985 | Gowda et al. ................. | 277/410 |
| 4,604,229 A * | 8/1986 | Raj et al. ....................... | 252/510 |
| 4,673,997 A * | 6/1987 | Gowda et al. ................. | 360/271.3 |
| 5,421,892 A | 6/1995 | Miyagi | |
| 5,490,425 A | 2/1996 | Raj et al. | |
| 5,940,246 A * | 8/1999 | Khan et al. ................... | 360/99.08 |
| 6,543,782 B1 * | 4/2003 | Rosensweig et al. ......... | 277/410 |
| 6,736,402 B1 * | 5/2004 | Li .................................. | 277/410 |
| 6,857,635 B1 * | 2/2005 | Li et al. ......................... | 277/410 |
| 7,183,778 B2 * | 2/2007 | Homan et al. ................. | 324/693 |
| 2003/0121778 A1 * | 7/2003 | Dodgson et al. .............. | 204/401 |
| 2004/0173972 A1 * | 9/2004 | Li et al. ......................... | 277/500 |
| 2006/0043682 A1 * | 3/2006 | Li .................................. | 277/410 |
| 2008/0211193 A1 | 9/2008 | Li | |
| 2009/0189616 A1 * | 7/2009 | Krutz et al. ................... | 324/548 |
| 2009/0315267 A1 * | 12/2009 | Castleman .................... | 277/312 |

FOREIGN PATENT DOCUMENTS

| | | |
|---|---|---|
| EP | 0 259 067 A2 | 3/1988 |
| EP | 0 259 067 A3 | 3/1988 |
| EP | 0259067 A2 | 3/1988 |
| JP | 07-190201 * | 7/1995 |
| JP | 07-190201 A | 7/1995 |
| JP | 09-089822 A | 4/1997 |
| JP | 2009-008176 A | 1/2009 |

* cited by examiner

*Primary Examiner* — Jermele M Hollington
*Assistant Examiner* — Demetrius Pretlow
(74) *Attorney, Agent, or Firm* — Robert R. Deleault, Esq.; Mesmer & Deleault, PLLC (57) ABSTRACT

A failure indicator seal includes a nonmagnetic housing, a plurality of annular pole pieces having distal ends, the plurality of annular pole pieces disposed within the nonmagnetic housing, an annular, non-conducting magnet disposed between the pole pieces, a predefined quantity of magnetic fluid disposed between each of the distal ends of the plurality of annular pole pieces and the rotary shaft of a rotary feedthrough forming a plurality of magnetic fluid O-ring seals, and means for measuring resistance through the plurality of annular pole pieces, the plurality of magnetic fluid O-ring seals and the rotary shaft.

19 Claims, 6 Drawing Sheets

FAILURE INDICATOR SEAL FOR A ROTARY FEEDTHROUGH

BACKGROUND OF THE INVENTION

1. Field of the Invention

The present invention relates generally to the field of rotary feedthrough seals. Particularly, the present invention relates to a rotary feedthrough seal assembly.

2. Description of the Prior Art

Rotary feedthroughs have been developed for use in closed systems that may be under vacuum or at atmospheric pressure or at elevated pressure. These seals are typically high pressure mechanical seals. The function of these rotary feedthroughs is to provide a virtually hermetic, rotating seal. There are basically two types of rotary feedthrough seals. These include mechanical seals such as, for example, where O-rings are positioned around a shaft or where magnetic fluid and its accompanying magnetic system are positioned around a shaft.

Magnetic fluid feedthroughs have been developed for use in vacuum systems where they perform the function of providing a virtually hermetic rotating seal. These products rely on the entrapment of magnetic fluid and its ability to withstand a pressure differential when magnetically trapped. Vacuum feedthroughs are designed to withstand low pressures on the order of 1 to 2 atmospheres and are impervious to gaseous medium.

Figure 1:
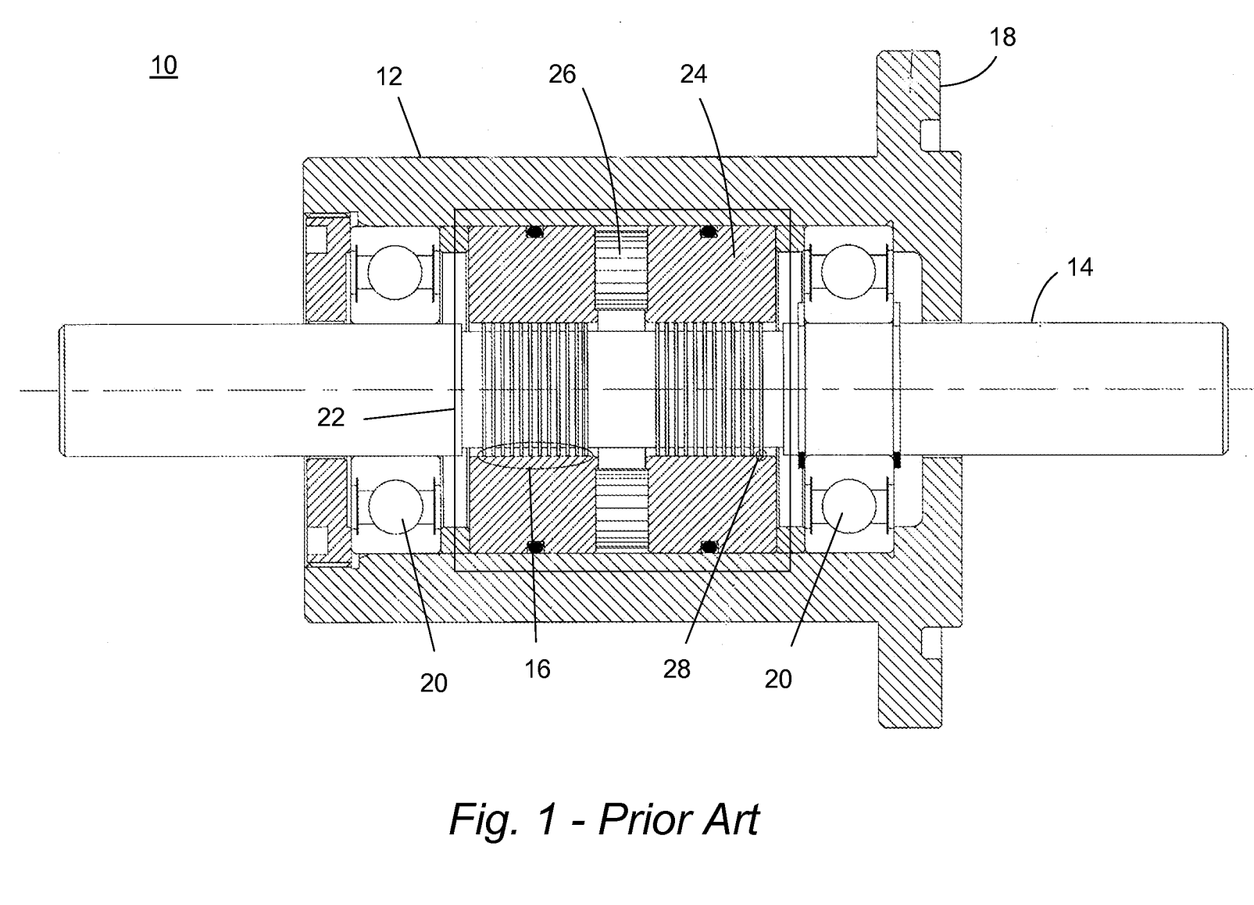
FIG. 1 is a cross-sectional view of one embodiment of a prior art magnetic fluid rotary feedthrough showing the shaft, magnet, pole pieces, support bearings and magnetic fluid disposed in a housing.

A conventional design of a magnetic fluid feedthrough is illustrated in FIG. 1. A magnetic fluid rotary feedthrough 10 typically has a housing 12 and a rotary shaft 14 that extends out of housing 12. Shaft 14 is magnetically permeable and has two sets of stages or teeth 16. Housing 12 is typical of a conventional feedthrough using a standard vacuum compatible flange 18 for mounting the rotary feedthrough 10 to a vacuum chamber. Shaft 14 is usually supported by a pair of bearings 20 that are disposed on either side of the magnetic fluid seal 22. The magnetic fluid seal 22 consists of two stationary, annular, magnetically-permeable elements 24, which are referred to as pole-pieces. Pole-pieces 24 carry magnetic flux from a permanent magnet or magnets 26, disposed between the pole-pieces 24. The magnetic flux is concentrated at the shaft 14 by a series of stages or teeth 16 cut into shaft 14. The shape of these stages or teeth 16 can be rectangular or triangular. Magnetic fluid or ferrofluid 28 is trapped within the concentrated magnetic flux and acts as "liquid o-rings" at stages 16. Shaft 14 is rotated usually by an electric motor, which can be external or integrated into housing 12.

Magnetic fluids or ferrofluids are colloidal suspensions of magnetic particles in a continuous phase. Colloidal stability is achieved by the use of a suitable surfactant. The continuous phase is selected on the basis of the application. For a vacuum application, this is an oil with a very low vapor pressure. The volume fraction of the magnetic particles is low, typically around 5-14%. However, owing to the surrounding surfactant layer, the effective volume fraction is significantly larger than the particle volume fraction.

When magnetic fluid is trapped by magnetic forces, the liquid o-rings are able to resist an external pressure and therefore act as a seal. These seals are hermetic and, being non-contacting, do not produce contamination making them ideal for processes conducted within a vacuum chamber. The shaft is usually driven by a motor or some other means and rotary motion is transferred from the outside into the clean environment of the vacuum chamber.

Such feedthroughs have been shown to successfully operate from a few revolutions per hour up to several tens of thousands of revolutions per minute. Pressure capability extends from ultra high vacuum to many tens of atmospheres. Leak rates are almost immeasurable at values of $1 \times 10^{-11}$ cc/sec or lower. Operating temperature vary from as low as −55° C. to +200° C. with suitable protective measures.

Magnetic fluid or ferrofluid rotary feedthroughs are commonly used in vacuum systems where a hermetic, non-contaminating seal is required; systems typified by semiconductor, precision optics and solar cell manufacture. In all cases, these rotary feedthroughs are high precision components utilizing precision bearings and often including integrated motors and encoders. The systems they are typically used on are high value capital equipment and the expected uptime of the entire system can be as high as 99%. Many of these systems, particularly in the semiconductor environment, are operated under clean room conditions where entry by people is restricted.

The maintenance of a good vacuum in the equipment is essential and the rotary vacuum feedthrough is regarded as an item of critical importance. While the reliability of these feedthroughs is excellent, there is still a need for preventative maintenance. There are circumstances such as over temperature or contamination where the integrity of the feedthrough can be compromised.

In the case of solar cell manufacture where rotary vacuum feedthroughs are an integral part of the transportation mechanism and where there can be many hundred of such feedthroughs in operation on a single machine, it is often very difficult to identify one feedthrough in many where there is a problem with feedthrough integrity. This is particularly difficult in the case of an intermittent or sporadic fault. Often, the only evidence that a feedthrough is leaking is when atmospheric contamination of the product is observed rendering it unusable. Additionally, the offending rotary feedthrough needs locating and replacing, which is not a trivial exercise in a chamber that could be as much as 100 meters long with over 200 rotary feedthroughs. Once the offending feedthrough is located and replaced the chamber needs to be re-evacuated, a process that can take many days resulting in a loss of production.

Therefore, what is needed is a rotary feedthrough that is more easily maintained. What is also needed is a rotary feedthrough that is more easily identified when the rotary feedthrough is about to fail.

SUMMARY OF THE INVENTION

Magnetic fluid rotary feedthroughs and high pressure mechanical seals are often seen as critical components in the equipment where they are used to maintain a dynamic rotary seal over extended periods of time and diverse operating conditions. A typical application for a high pressure mechanical seal is in the petrochemical industry for containment of pollutant gases. These are pressure seals and are not used for vacuum application. The magnetic fluid seal may work in tandem with a high pressure mechanical seal. To ensure clean environments, there should be no leakage of pollutant gases.

Dynamic rotary vacuum sealing is a very difficult problem to solve particularly as any leak of atmospheric gases into the vacuum chamber can result in contamination of the product resulting in either loss of yield or complete ruination of the product. Consequently, magnetic fluid rotary feedthroughs have become the accepted standard and under normal operating conditions these feedthroughs are very reliable, operating successfully without servicing for many years. Indeed, it is the very reliability of these devices that leads users to assume that they will continue operating without attention indefinitely. However, it must be recognized that exposure of the magnetic fluid to a very high vacuum, particularly if the process is at a high temperature, can result in a slow and steady evaporation of the oil. The evaporation rate is mainly dependant on the level of the vacuum and the temperature, both of which tend to change over the operating life of the product. However, for high quality magnetic fluids, operating even at very high temperatures, the evaporation is at such an extremely low rate it takes place over many years. Therefore, it makes any decision of "if" and "when" to service the feedthrough particularly difficult to define.

Feedthroughs, especially those operating at high speeds or high loads, are particularly demanding on the bearings. These demands are magnified as bearing lubricants that are compatible with vacuum operation are not particularly good compared to conventional bearing lubricants. Therefore, failure of the bearing within the vacuum environment is often observed while the bearing on the atmosphere side, often lubricated with a good quality conventional lubricant, remains in excellent condition. There is considerable supporting data to enable the prediction of bearing life using conventional lubricants and this enables preventative maintenance cycles to be accurately specified. There is little supporting data, however, on the demands of operating in a vacuum environment with relatively poor lubricants. The wide variation in life over diverse operating conditions coupled with the large error band on any supporting data makes the definition of a suitable maintenance schedule very difficult.

For both of the above reasons, low evaporation rates and difficulty in defining bearing life, magnetic fluid feedthroughs are either replaced at unnecessarily short intervals or, alternatively, not replaced at all until they fail. Neither solution represents a satisfactory situation for a component often seen as having critical importance. It is advantageous to be able to monitor the condition of feedthroughs and signal their condition to operators or diagnostic equipment.

Therefore, it is an object of the present invention to provide a rotary feedthrough that is capable of indicating the condition of the rotary feedthrough. It is another object of the present invention to provide a rotary feedthrough that is capable of indicating the condition of the rotary feedthrough to enable maintenance when required of the feedthrough at a scheduled shut down. It is a further object of the present invention to provide a rotary feedthrough with a means to easily identify a potentially failing rotary feedthrough among a plurality of rotary feedthroughs. It is still another object of the present invention to provide a rotary feedthrough that is capable of providing an advanced warning of a potential problem with the rotary feedthrough. It is yet another object of the present invention to enable identification of a problem feedthrough in a degraded condition operating amongst a plurality of feedthroughs.

The present invention achieves these and other objectives by providing a rotary feedthrough system with a failure indicator seal coupled to the rotary shaft of a rotary seal feedthrough. In one embodiment, a failure indicator seal is adapted for use in a multistage vacuum rotary feedthrough system where the failure indicator seal is coupled to the rotary shaft of a multistage vacuum rotary seal feedthrough, signal processing electronics and one or more output devices. As is known in the art, the multistage vacuum rotary feedthrough has an atmospheric side and a vacuum side.

In another embodiment, a failure indicator seal for a multistage vacuum rotary feedthrough having a rotary shaft includes a nonmagnetic housing, a plurality of annular pole pieces having proximal ends and disposed within the nonmagnetic and electrically insulating housing, an annular, electrically non-conducting magnet disposed between the pole pieces, a predefined quantity of magnetic fluid disposed between each of the proximal ends and the rotary shaft of the multistage vacuum rotary feedthrough forming a plurality of magnetic fluid O-ring seals, and means for measuring resistance through the plurality of magnetic fluid O-ring seals and the rotary shaft.

In another embodiment, signal processing electronics are mounted to or incorporated in the multistage vacuum rotary feedthrough. The signal processing electronics receive one or more sensor output signals from the failure indicator seal, process the sensor output signals and outputs one or more electronic processing signals. The output device or devices receive the electronic processing signals from the signal processing electronics to indicate the condition of the multistage magnetic fluid seal.

In another embodiment of the present invention, the means for measuring resistance of the magnetic fluid O-ring seals is selected from the group consisting of serial resistance and parallel resistance.

In yet another embodiment of the present invention, the serial resistance means includes a first pole piece with a first electrical connection coupled to the first pole piece and a second pole piece with a second electrical connection coupled to the second pole piece. The serial resistance is measured through the first pole piece, the predefined quantity of magnetic fluid coupling the first pole piece to the rotary shaft and the rotary shaft forming a first resistor, and the rotary shaft, the predefined quantity of magnetic fluid coupling the second pole piece to the rotary shaft and a second electrical connection coupled to the second pole piece forming a second resistor.

In a further embodiment of the present invention, the plurality of annular pole pieces coupled to the serial resistance means is positioned on the rotary shaft of the multistage rotary feedthrough to provide a plurality of atmospheric side stages between the indicator seal and the atmosphere, the plurality of atmospheric side stages having a pressure capacity of greater than 14.7 psi.

In another embodiment of the present invention, the resistance values of the first resistor and the second resistor are the same.

In a further embodiment of the present invention, the resistance values of the first resistor and the second resistor are different. The different resistance values arise by one or more of different radial gap, different fluid amount and different fluid type In another embodiment of the present invention, the annular nonconducting magnet is the magnet of the multistage vacuum rotary feedthrough.

In still another embodiment of the present invention, the parallel resistance means includes a first pole piece, a first electrical connection coupled to the first pole piece, a plurality of stages formed into the first pole piece or the rotary shaft, each stage having a predefined quantity of magnetic fluid between the rotary shaft and the first pole piece forming a plurality of O-ring seals, a bearing electrically coupled to the rotary shaft and electrically insulated from the pole piece, and a second electrical connection coupled to the bearing whereby the parallel resistance is measured through the first pole piece, the plurality of O-ring seals, the rotary shaft and the bearing.

In another embodiment of the present invention, the first annular pole piece having the plurality of O-ring seals has a plurality of atmospheric side stages and a vacuum side stage. The plurality of atmospheric side stages has a pressure capacity of greater than 14.7 psi In yet another embodiment of the present invention, the plurality of atmospheric side stages have magnetic fluid with a higher magnetization than the magnetic fluid employed in the vacuum side stage or the plurality of atmospheric side stages have a smaller radial gap between each atmospheric side stage and the rotary shaft than the vacuum side stage or a combination thereof.

In another embodiment of the present invention, the failure indicator seal further includes an auxiliary magnet to incorporate a higher magnetic flux density in the atmospheric side stages.

In another embodiment of the present invention, the sensor signals and/or the electronic processing signals are digital signals, analog signals, or a combination of digital and analog signals. Optionally, the sensor signals and/or the electronic processing signals may be transmitted by directly electrically coupling the transmitting and receiving components or by wirelessly coupling the components.

In still another embodiment of the present invention, the signal processing electronics contains a computational circuit for determining the rate of change over time of a measured physical parameter measured by the one or more sensors.

In still another embodiment of the present invention, there is a method of determining the condition of a magnetic fluid rotary feedthrough that includes providing a failure indicator seal having a nonmagnetic housing, a plurality of annular pole pieces having distal ends, the plurality of annular pole pieces disposed within the nonmagnetic housing, an annular, non-conducting magnet disposed between the pole pieces, the failure indicator seal being positioned around a rotary shaft of a multistage vacuum rotary feedthrough, a predefined quantity of magnetic fluid disposed between each of the distal ends of the plurality of annular pole pieces and the rotary shaft of the multistage vacuum rotary feedthrough forming a plurality of magnetic fluid O-ring seals, and measuring a serial resistance value through the plurality of annular pole pieces, the plurality of magnetic fluid O-ring seals and the rotary shaft.

In a further embodiment of the present invention, the method includes comparing the measured serial resistance value to a predefined serial resistance value of the failure indicator seal having a predefined radial gap, a predefined magnetic fluid amount and a predefined magnetic fluid type.

In another embodiment of the present invention, the method includes indicating an impending feedthrough seal failure using the compared serial resistance value to the predefined serial resistance value.

In yet another embodiment of the present invention, a method of indicating seal failure in a multistage vacuum rotary feedthrough includes providing a failure indicator seal having a nonmagnetic housing, a first annular pole piece having a plurality of stages, an annular, non-conducting magnet disposed between the first annular pole piece and a second annular pole piece, the failure indicator seal being positioned around a rotary shaft of the multistage vacuum rotary feedthrough, a predefined quantity of magnetic fluid disposed between each of a plurality of stages formed in the first annular pole piece, the rotary shaft, or both, forming a plurality of magnetic fluid O-ring seals, and a bearing electrically insulated from the first annular pole piece and electrically coupled to the rotary shaft, and measuring a parallel resistance value through the plurality of magnetic fluid O-ring seals.

In another embodiment of the present invention, the method includes comparing the measured parallel resistance value to a predefined serial resistance value table having seal parallel resistance values as a function of stage failure for an indicator seal having a predefined radial gap, a predefined magnetic fluid amount and a predefined magnetic fluid type.

In another embodiment of the present invention, the method includes indicating an impending feedthrough seal failure using the compared parallel resistance value to a predefined parallel resistance value.

DETAILED DESCRIPTION OF THE PREFERRED EMBODIMENT

Figure 2:
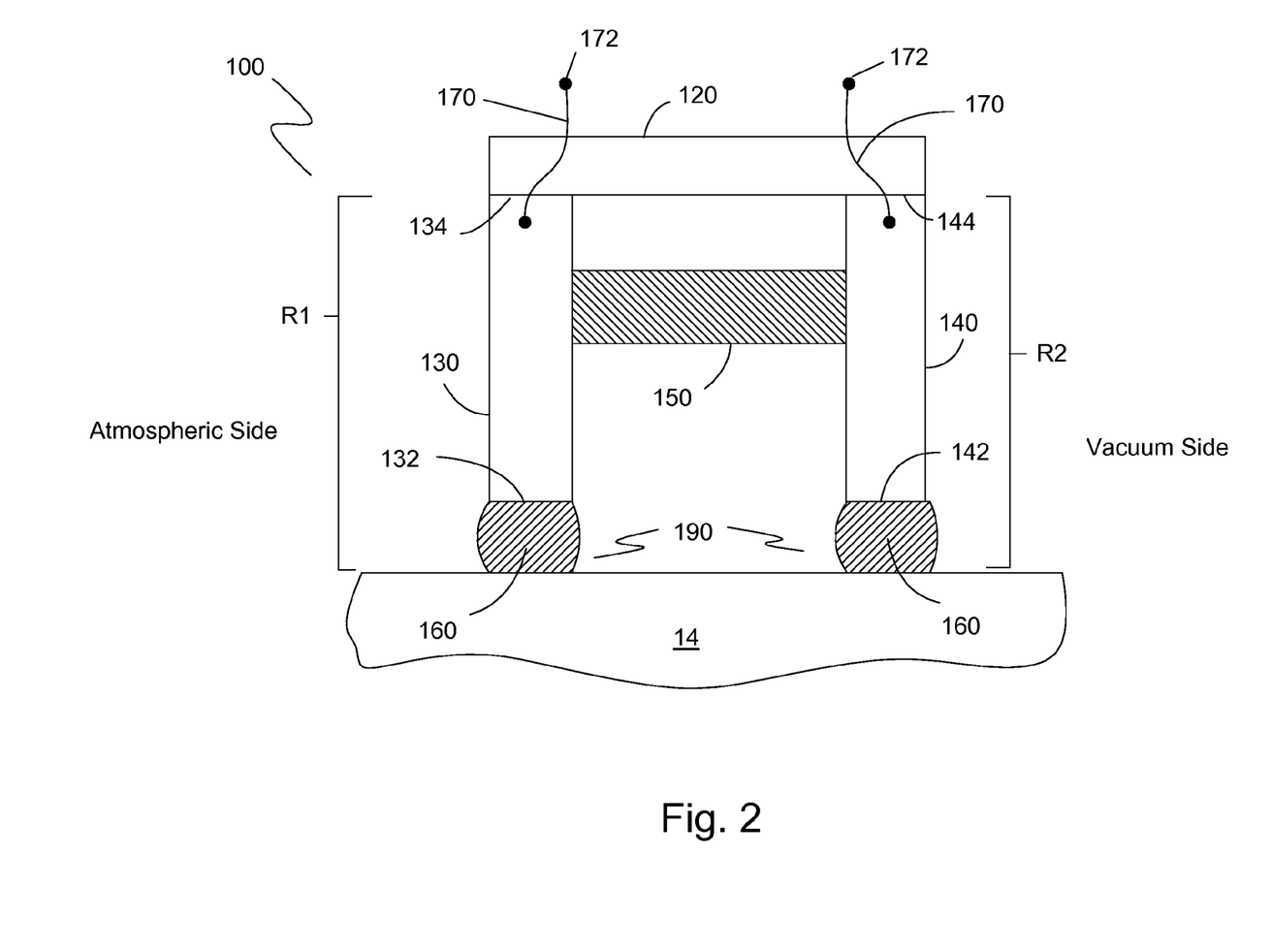
FIG. 2 is a partial cross-sectional view of one embodiment of the present invention showing a failure indicator seal for incorporating into a magnetic fluid rotary feedthrough.

The preferred embodiment of the present invention is illustrated in FIGS. 2-7. FIG. 2 shows one embodiment of a failure indicator seal 100 in a partial cross-sectional view. Failure indicator seal 100 is incorporated into a magnetic fluid rotary feedthrough and uses resistance measurements to determine the condition of the magnetic fluid rotary feedthrough. Failure indicator seal 100 includes a housing 120, a first annular pole piece 130, and a second annular pole piece 140 adapted for disposing around a rotary shaft 14 of a magnetic fluid vacuum feedthrough 10 (not shown) that extends out of a feedthrough housing 12 (not shown). Failure indicator seal 100 also optionally includes an electrically non-conducting magnet 150 disposed between first pole piece 130 and second pole piece 140. Magnet 150 is optional since the magnet of the magnetic fluid vacuum feedthrough 10 may be used as the magnetic source instead of incorporating magnet 150. The magnet 150 may also be electrically conducting but in that case magnet 150 must be coated with an insulating material or placed inside an insulating sleeve. First pole piece 130 and second pole piece 140 have proximal ends 132, 142, respectively, that are spaced from but adjacent to shaft 14 defining an annular gap 190 and distal ends 134, 144 connected to electrically insulating housing 120. A predefined quantity of magnetic fluid 160 is disposed between each proximal end 132, 142, which forms an O-ring seal between shaft 14 and each of proximal ends 132, 142. As is known in the art, the predefined quantity of magnetic fluid 160 is held in place due to the magnetic field induced by the magnet 150 or the magnet in the feedthrough. Pole piece 130 and pole piece 140 are each electrically coupled to an output 172 by a conductive path 170.

Figure 3:
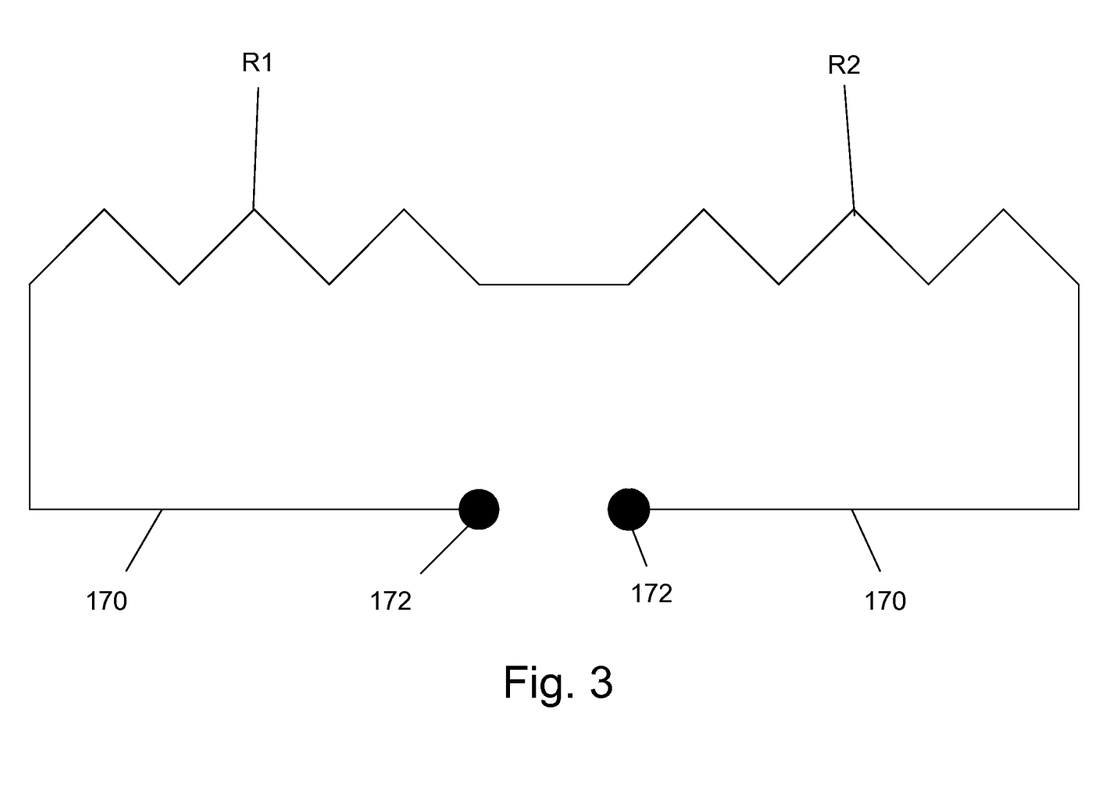
FIG. 3 is a graphical illustration of the electrical resistance circuit in the embodiment shown in FIG. 2.

The two pole seal, i.e. failure indicator seal 100, is incorporated into a multistage vacuum rotary feedthrough at an appropriate location along the feedthrough's axial length. The two O-ring seals at proximal ends 132, 142 present an electrical resistive path between the shaft 14 and pole pieces 130, 140 in addition to having a predefined pressure capacity against gaseous pressure. As illustrated, each of the pole pieces 130, 140 and their respective, predefined quantity of magnetic fluid 160 form a resistor R1, R2, respectively. A graphical illustration of the resistors are shown in FIG. 3. As shown, the resistors R1, R2 act in series. As is known by those skilled in the respective art, the resistance of series circuits is represented by $R = R1 + R2 + \ldots + Rn$ where n represents the total number of stages in the failure indicator seal 100. The two pole seal is placed in the vacuum feedthrough such that the atmospheric side stages of the feedthrough beyond the first pole piece 130 have a total pressure capacity of greater than 14.7 pounds per square inch (psi). The two resistors R1, R2 may have the same or different values depending on the design of the seal such as the radial clearance or gap, the magnetic fluid amount, the magnetic fluid type, etc.

In use, this embodiment measures the serial resistance of the magnetic fluid O-ring seals disposed between shaft 14 and proximal ends 132, 134 of pole pieces 130, 140, respectively. Partial failure of the vacuum side magnetic fluid O-ring seal in failure indicator seal 100 causes the resistance value of failure indicator seal 100 to increase. Contamination of magnetic fluid 160 is only one example of a condition that would exhibit such a partial failure. Complete failure of the vacuum side magnetic fluid O-ring seal in failure indicator seal 100 provides an infinite resistance reading/value (i.e. an open circuit) to be measured. The measured resistance value of failure indicator seal 100 is monitored. When the measured resistance value rises above a threshold value determined for a particular failure indicator seal configuration (a comparison performed by the associated electronic circuits), a warning signal is generated indicating the degraded condition of the multistage vacuum rotary feedthrough of which failure indicator seal 100 is a part. By placing failure indicator seal 100 in the vacuum rotary feedthrough such that there are sufficient atmospheric side stages to provide sufficient pressure capacity (greater than 14.7 psi) for a safety margin, servicing of the vacuum rotary feedthrough can then be scheduled at an appropriate time without risking complete magnetic fluid rotary feedthrough failure and contamination of the associated process and/or product for which the rotary feedthrough is used.

The seal design in FIG. 2 can also be a stand-alone seal. Such seals have pressure capacity of 4 to 10 psi. A typical application is in the petrochemical industry for containment of pollutant gases. These are pressure seals and are not used for vacuum application. The magnetic fluid seal may work in tandem with a high pressure mechanical seal. To ensure clean environments, there should be no leakage of pollutant gases. Thus, a failure indicator seal of FIG. 2 in a series or parallel resistance configuration is of importance for such environmentally sensitive applications.

Figure 4:
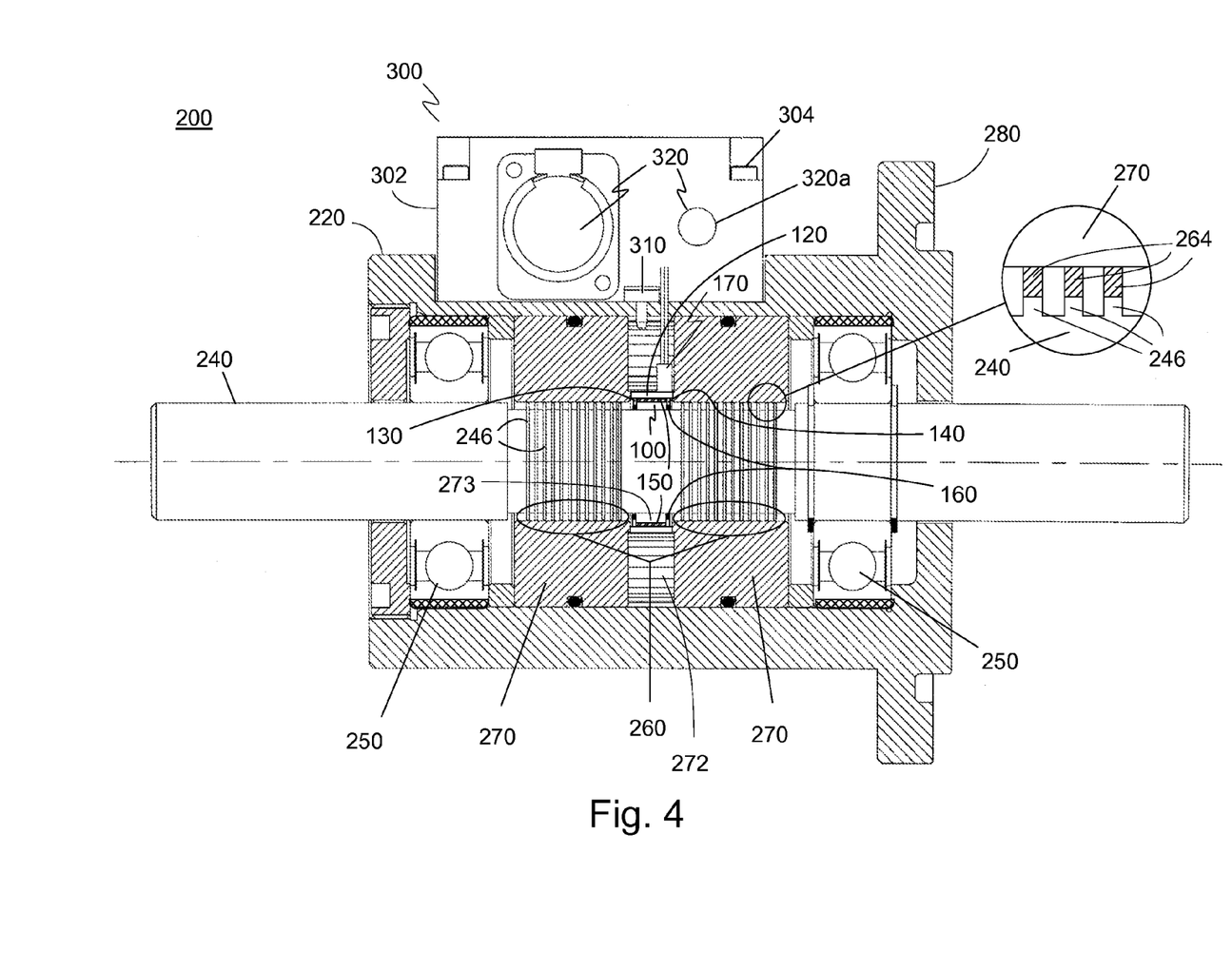
FIG. 4 is a partial cross-sectional view of one embodiment of the present invention showing a magnetic fluid rotary feedthrough with resistance-based failure indicator seal and an Ethernet connection.

FIG. 4 shows one embodiment of a magnetic fluid rotary feedthrough 200 of the present invention in a partial cross-sectional view with failure indicator seal 100 incorporated therein. Rotary feedthrough 200 includes a feedthrough housing 220 and a rotary shaft 240 that extends out of feedthrough housing 220. Shaft 240 is magnetically permeable and has two sets of stages or teeth 246. Housing 220 includes a vacuum compatible flange 280 for mounting the rotary feedthrough 200 to a vacuum chamber. Shaft 240 is typically supported by a pair of bearings 250 that are disposed on either side of the magnetic fluid seal 260. The magnetic fluid seal 260 includes two stationary, magnetically-permeable elements 270, which are referred to as pole-pieces. Pole-pieces 270 carry magnetic flux from a permanent magnet or magnets 272, disposed between pole-pieces 270. Magnets 272 typically have a larger inside annular diameter than pole pieces 270 creating a magnet space 273. The purpose of space 273 is to prevent the magnetic fluid 264 from migrating to magnet 272 due to magnetic attraction. It also insures that the teeth 246 maintain the concentrated magnetic flux to trap the magnetic fluid 264 at teeth 246. The magnetic flux is concentrated at shaft 240 by a series of stages or teeth 246 cut into shaft 240. The shape of stages or teeth 246 may be rectangular, triangular, trapezoidal, angular, or any other shape or combinations of the various shapes and is not critical to the present invention. Magnetic fluid 264 is trapped within the concentrated magnetic flux and acts as "liquid o-rings" at stages 246. Shaft 240 is rotated usually by an electric motor, which can be external or integrated into feedthrough housing 220. In this embodiment, failure indicator seal 100 is positioned in magnet space 273. The unique feature of the present invention is the inclusion of a combination of a resistance measuring means, processing electronics and output devices in rotary feedthrough 200. In one embodiment illustrated in FIG. 4, there is also included a feedthrough status monitor device 300.

Feedthrough status monitor device 300 includes a monitor housing 302 connected to feedthrough housing 220, one or more sensors 310, one or more output devices 320, and processing electronics (not shown). One or more housing fasteners 304 secure monitor housing 302 to feedthrough housing 220. The signal processing electronics are preferably housed within monitor housing 302 but could also be integral to feedthrough housing 220 or encased in a separate electronics housing. Each of the one or more sensors 310, which includes failure indicator seal 100, is electrically coupled to the signal processing electronics. Signal processing electronics are also electrically coupled to the one or more output devices 320. Sensors 310 monitor various predefined measurable values that reflect the condition of rotary feedthrough 200. The embodiment of failure indicator seal 100 illustrated in FIG. 2 is shown in FIG. 4. In this embodiment, there is included the electrically non-conducting housing 120, first pole piece 130, second pole piece 140, electrically non-conducting magnet 150, and the predefined quantity of magnetic fluid 160 disposed between the proximal ends 132, 142 of first and second pole pieces 130, 140, respectively and shaft 240.

Figure 5:
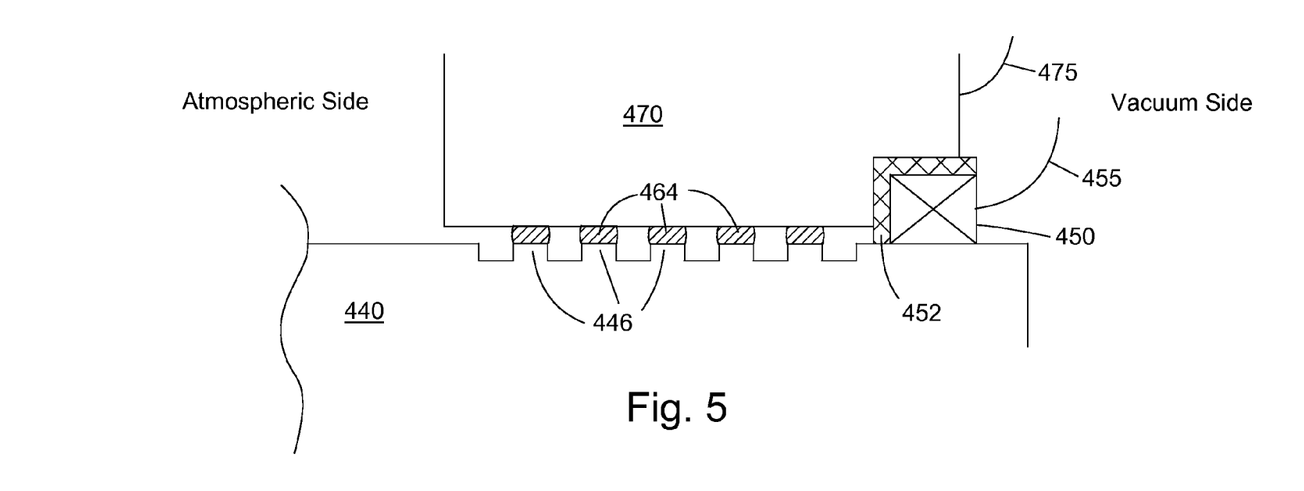
FIG. 5 is a simplified, side view of one embodiment of the present invention showing a multistage, magnetic fluid rotary seal with electrical leads connected to a pole piece and a bearing that is electrically insulated from the pole piece for monitoring the resistance of the magnetic fluid seal.

Another option to monitor the condition of a magnetic fluid seal is to measure the parallel resistance of the seal. This method is based on the idea that each magnetic fluid O-ring seal acts as an independent resistor between the shaft 440 and the pole piece 470. Turning to FIG. 5, there is illustrated a partial, cross-sectional view of another embodiment of a magnetic fluid seal. In this embodiment, there is shown a rotating shaft 440, a set of circumferential stages or teeth 446 disposed around shaft 440, a stationary, magnetically-permeable pole piece 470, and a support bearing 450. As described previously, a predetermined quantity of magnetic fluid 464 is held in position between each individual stage 446 and pole piece 470 by the concentrated magnetic flux from the permanent magnet or magnets 472 (not shown). Bearing 450 is either non-metallic or, if metallic, is electrically insulated by a coating 452 of an electrical insulator such as, for example, ceramic to prevent any current flow between shaft 440 and pole piece 470 through bearing 450. Electrical leads 455 and 475 are electrically coupled to bearing 450 and pole piece 470, respectively. Based on experimental evidence, degradation of the magnetic fluid seal occurs from the first stage 446 on the process environment side of the seal and proceeds towards the atmospheric side of stages 446. The evaporation rate of a magnetic fluid under vacuum is about ten times higher than under atmospheric pressure. Thus, the O-ring seal under full vacuum dries up faster, which is then followed by those under partial pressures and finally by those under atmospheric pressure.

Figure 6:
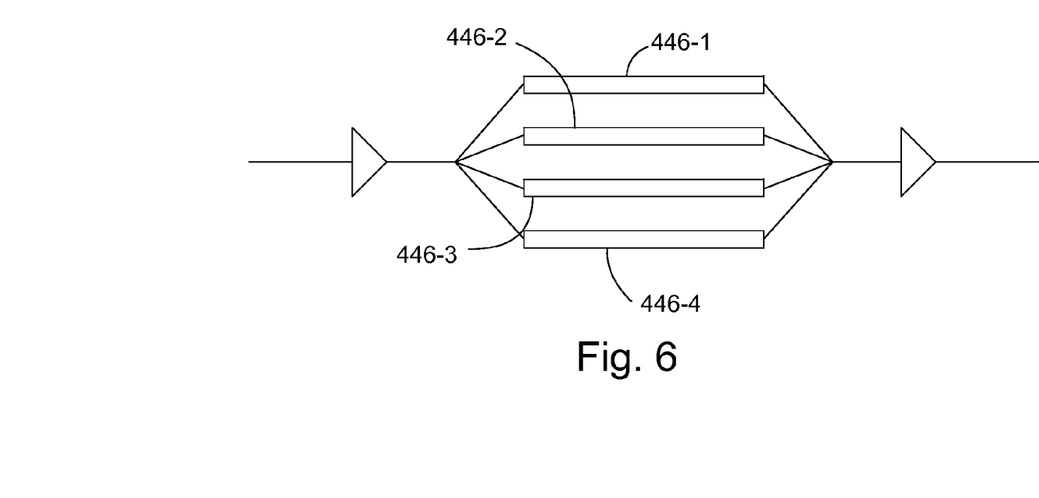
FIG. 6 is a graphical illustration of the electrical resistance circuit of the multistage seal in the embodiment shown in FIG. 5.

The electrical resistivity of a typical oil-based magnetic fluid is about 1 E+9 ohm-centimeter at room temperature. In a well designed seal, all O-ring seals or stages have the same electrical resistance. Due to the structure of the seal, these resistances are connected in parallel. FIG. 6 is a graphical illustration of the resistance circuit of the O-ring seals. Each graphic element 446-1 through 446-4 is a representation of the "resistor" R1, R2, R3, R4 where each one is an individual O-ring magnetic fluid seal that are connected together in parallel. As is known by those of skill in the respective art, the resistance of parallel circuits are represented by the equation $1/R=1/R_1+1/R_2+1/R_3+1/R_4+ \ldots +1/R_n$ where n represents the total number of stages in the magnetic fluid seal. A failed stage 446 means that magnetic fluid 464 is no longer present in the gap between stage 446 and pole piece 470 and, thus, offers infinite resistance and a fractional loss of the total pressure capacity of the seal. In addition, a stage having degraded fluid may exhibit a different resistance value than the normal expected value. Since magnetic fluid seals are typically designed with a safety factor of two to three times the required pressure capacity of an application, the failure of one stage does not indicate an impending failure. It does, however, indicate the degraded condition of the seal. The following table contains calculated resistance data of a magnetic fluid seal having fourteen stages, a magnetic fluid resistivity at 25° C. of 1 E+9 ohm-cm, a radial gap of 0.003 inches (0.076 mm), a stage width of 0.01 inch (0.25 mm), a shaft diameter of 0.5 inch (12.7 mm), and a calculated value of resistance per stage of 7.5 E+7 ohms.

TABLE 1

| number of stages failed | resistance of seal (ohms) |
|---|---|
| 0 | 5.40E+06 |
| 1 | 5.70E+06 |
| 2 | 6.30E+06 |
| 3 | 6.80E+06 |
| 4 | 7.50E+06 |
| 5 | 8.30E+06 |
| 6 | 9.40E+06 |
| 7 | 1.07E+07 |
| 8 | 1.25E+07 |
| 9 | 1.50E+07 |
| 10 | 1.88E+07 |
| 11 | 2.50E+07 |
| 12 | 3.75E+07 |
| 13 | 7.50E+07 |
| 14 | ∞ |

Figure 7:
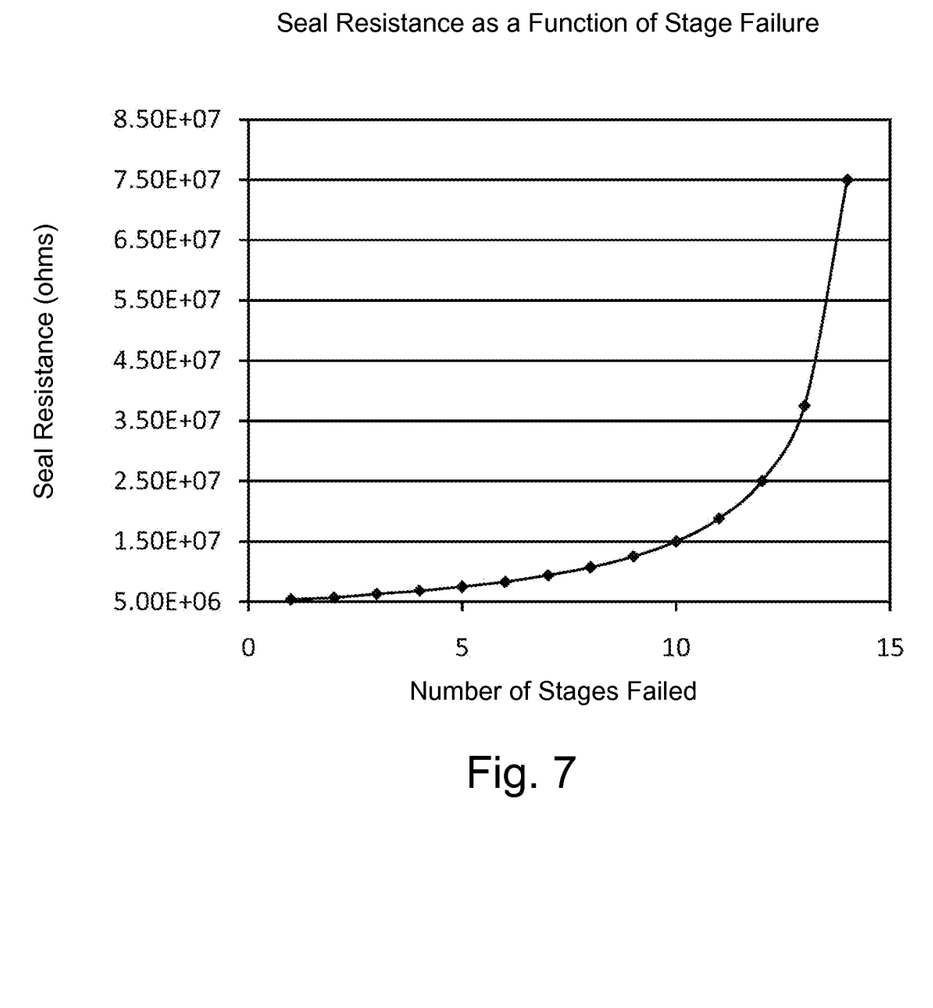
FIG. 7 is a graphical illustration of the seal resistance for a parallel resistance means as a function of stage failure in a magnetic seal having fourteen stages.

The calculations are performed for a typical seal consisting of fourteen stages. The data shows that resistance changes slowly initially but as the number of failed stages increases, the resistance shows a rapid increase. From the resistance value, one can infer how many stages are still intact and the remaining pressure holding capacity of the seal. For a seal operating under vacuum, the pressure capacity should be greater than 14.7 psi (100.3 kPa). A seal having an increase in resistance to a value slightly above the representative value of a seal with a pressure capacity only slightly greater than 14.7 psi indicates an impending failure. FIG. 7 is a graphical illustration of the data from Table 1 showing seal resistance as a function of stage failure.

As seen in FIG. 7, the resistance increases more rapidly as the last few stages 446 in a 14-stage seal remain intact. It is contemplated that detecting seal condition at the rapidly changing portion of the curve due to the higher sensitivity may be advantageous. It may also be advantageous to provide the remaining few stages 446 with an increased pressure capacity. This may be achieved by using magnetic fluid with a higher magnetization than that employed in the other stages 446. An alternative to changing the magnetic fluid magnetization may include the incorporation of a smaller radial gap for these remaining few stages or an auxiliary magnet in the design so that these stages are endowed with a higher magnetic flux density, or both.

It is contemplated that the two pole piece indicator seal shown in FIG. 2 has the resistors R1 and R 2 in series as illustrated in FIG. 3. This is due to the fact that housing 120 is electrically non-conducting. When the housing 120 is electrically conducting, the two resistors R1 and R2 are then in parallel. In this case, the bearing 450 must be non metallic as shown in FIG. 5. The electrical leads 455 and 475 complete the electrical path for the parallel resistance, with housing 120 in electrical contact with the pole piece 470. The other possibility pertaining to forming a parallel resistance path for R1 and R2 is to keep housing 120 (FIG. 2) as insulating but to connect both leads 170 as one. The common lead is then connected to the pole piece 470. The resistance measurement for the indicator seal is made between the leads 455 and 475. When magnetic fluid 160 is evaporated away from either of the proximal ends 132 or 142, the seal resistance is doubled and it becomes infinite when it is evaporated away from both ends: 132 and 142.

It should be understood that in the example above, the magnetic fluid is a magnetic fluid having a relatively high resistivity value. A magnetic fluid having lower resistivity may be used in applications where required or appropriate. Resistivity of a magnetic fluid depends upon its composition such as the magnetic particle concentration, carrier type, and dispersant amount. Magnetic fluids such as the one used in the example above are based on insulating oils and thus possess high resistivity. Possibilities exist, however, that the resistivity of the magnetic fluid may be controlled (decreased) by addition of electrically conducting polymers, carbon particles, carbon nanotubes, or bucky balls. Magnetic fluids based on conducting metal carriers such as gallium or mercury also possess low resistivity values.

It should further be understood that the electrical paths are presented above as examples only. Those who are skilled in the art may find other ways to form the circuits without changing the spirit of the disclosure.

Not all magnetic fluid feedthroughs 200 are used in vacuum applications. Some are used in pressure applications where a gas or chemical needs to be hermetically contained as any leakage of the gas or chemical could have serious consequences. Typical applications are (1) sterilisers where there is an explosion risk or (2) drug processing equipment where there is a potentially fatal risk to operators should any of the drug escape. Embedding suitable sensors within the feedthrough 200 and linking them to the communication devices allows potentially dangerous leaks to be detected before there is a leak to the environment.

Having identified the possible resistance configurations that can be measured within the feedthrough 200, it becomes possible to incorporate suitable electronics to process these variables and derive much useful data.

Having derived these variables and processed them, it is necessary to communicate these externally. Three situations will be defined:

1. Local, meaning any indicator that is local to the feedthrough 200. Such indicators could be visual, e.g. LED's, shown as reference number 320a in FIG. 4, gauges, or audible devices such as sounders, buzzers or sirens.

2. Remote, where the signal is transmitted, either in digital or analog form, away from the feedthrough 200 but remaining within the machine's or its operator's environment, its operating equipment or operating computer.

3. Global, meaning where the signal is transmitted, either in digital or analog form, away from the feedthrough 200 and outside the immediate machine environment. Typically, this is envisaged as a network or field bus. Ethernet-based systems may incorporate a web server and other network services, including "phone-home" systems, e-mail systems and simple network management protocol systems. Field bus systems would contain a transceiver required for the relevant bus system.

Remote or global signal transmission systems can also be effected by use of appropriate telemetry or wireless communication systems. Such systems are also contemplated by the present invention.

When there is a need to power the integrated electronics, various sources may be used including either integral energy sources such as batteries, power generation either from the rotation or from heat using thermo-electric modules, or by systems that supply power as well as data connectivity for example the Power Over Ethernet (POE) system and other Power Derived from Signal Bus ("Parasitically Powered") systems.

There are many advantages of the present invention. These advantages include, but are not limited to, remote monitoring of the feedthrough, early warning of the condition of the rotary feedthrough to enable maintenance of the feedthrough at a scheduled shut down, advanced warning of a potential problem with a rotary feedthrough or identification of its location in a system with a plurality of feedthroughs, more cost effective maintenance of feedthroughs, and improved reliability of the processes that use feedthroughs.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A failure indicator seal comprising:
a nonmagnetic housing;
a plurality of annular pole pieces having proximal ends, the plurality of annular pole pieces disposed within the nonmagnetic housing;
an annular, non-conducting magnet disposed between the pole pieces;
a predefined quantity of magnetic fluid disposed between each of the distal ends of the plurality of annular pole pieces and the rotary shaft of a multistage vacuum rotary feedthrough forming a plurality of magnetic fluid O-ring seals; and
means for measuring resistance through the plurality of annular pole pieces, the plurality of magnetic fluid O-ring seals and the rotary shaft.

2. The indicator seal of claim 1 wherein the means for measuring resistance through the plurality of annular pole pieces measure the serial resistance of the plurality of magnetic O-ring seals.

3. The indicator seal of claim 2 wherein the serial resistance means includes a first pole piece with a first electrical connection coupled to the first pole piece and a second pole piece with a second electrical connection coupled to the second pole piece whereby the serial resistance is measured through the first pole piece, the predefined quantity of magnetic fluid coupling the first pole piece to the rotary shaft and the rotary shaft forming a first resistor, and the rotary shaft, the predefined quantity of magnetic fluid coupling the second pole piece to the rotary shaft and a second electrical connection coupled to the second pole piece forming a second resistor.

4. The indicator seal of claim 3 wherein the plurality of annular pole pieces coupled to the serial resistance means is positioned on the rotary shaft of the multistage rotary feedthrough to provide a plurality of atmospheric side stages between the indicator seal and the atmosphere, the plurality of atmospheric side stages having a pressure capacity of greater than 14.7 psi.

5. The indicator seal of claim 3 wherein the resistance values of the first resistor and the second resistor are the same.

6. The indicator seal of claim 3 wherein the resistance values of the first resistor and the second resistor are different.

7. The indicator seal of claim 6 wherein the different resistance values are caused by one or more of different radial gap, different fluid amount and different fluid type.

8. The indicator seal of claim 1 wherein the annular non-conducting magnet is the magnet of the multistage vacuum rotary feedthrough.

9. A failure indicator seal comprising:
a first pole piece;
a first electrical connection coupled to the first pole piece;
a plurality of stages formed into the first pole piece or the rotary shaft, each stage having a predefined quantity of magnetic fluid between the rotary shaft and the first pole piece forming a plurality of O-ring seals;
a bearing electrically coupled to the rotary shaft and electrically insulated from the pole piece;
a second electrical connection coupled to the bearing; and
means for measuring a parallel resistance of the plurality of O-ring seals through the first pole piece, the rotary shaft and the bearing.

10. The indicator seal of claim 9 wherein the first annular pole piece having the plurality of O-ring seals has a plurality of atmospheric side stages and a vacuum side stage, the plurality of atmospheric side stages having a pressure capacity of greater than 14.7 psi.

11. The indicator seal of claim 10 wherein the plurality of atmospheric side stages have magnetic fluid with a higher magnetization than the magnetic fluid employed in the vacuum side stage.

12. The indicator seal of claim 10 wherein the plurality of atmospheric side stages have a smaller radial gap between each atmospheric side stage and the rotary shaft than the vacuum side stage.

13. The indicator seal of claim 10 further comprising an auxiliary magnet to incorporate a higher magnetic flux density in the atmospheric side stages.

14. A method of determining seal failure in a rotary feedthrough, the method comprising:
providing a failure indicator seal having a nonmagnetic housing, a plurality of annular pole pieces having distal ends, the plurality of annular pole pieces disposed within the nonmagnetic housing, an annular, non-conducting magnet disposed between the pole pieces, the failure indicator seal being positioned around a rotary shaft of a rotary feedthrough, a predefined quantity of magnetic fluid disposed between each of the distal ends of the plurality of annular pole pieces and the rotary shaft of the rotary feedthrough forming a plurality of magnetic fluid O-ring seals;

measuring a serial resistance value through the plurality of annular pole pieces, the plurality of magnetic fluid O-ring seals and the rotary shaft; and determining the condition of the rotary feedthrough.

15. The method of claim 14 further comprising comparing the measured serial resistance value to a predefined serial resistance value of the failure indicator seal having a predefined radial gap, a predefined magnetic fluid amount and a predefined magnetic fluid type.

16. The method of claim 15 further comprising indicating an impending feedthrough seal failure using the compared serial resistance value to the predefined serial resistance value.

17. A method of determining seal failure of a rotary feedthrough, the method comprising:

providing a failure indicator seal having a nonmagnetic housing, a first annular pole piece having a plurality of stages, an annular, non-conducting magnet disposed between the first annular pole piece and a second annular pole piece, the failure indicator seal being positioned around a rotary shaft of a rotary feedthrough, a predefined quantity of magnetic fluid disposed between each of a plurality of stages formed in the first annular pole piece, the rotary shaft, or both, forming a plurality of magnetic fluid O-ring seals, and a bearing electrically insulated from the first annular pole piece and electrically coupled to the rotary shaft;

measuring a parallel resistance value through the plurality of stages, the plurality of magnetic fluid O-ring seals and the rotary shaft; and determining the condition of the rotary feedthrough.

18. The method of claim 17 further comprising comparing the measured parallel resistance value to a predefined serial resistance value table having seal parallel resistance values as a function of stage failure for an indicator seal having a predefined radial gap, a predefined magnetic fluid amount and a predefined magnetic fluid type.

19. The method of claim 18 further comprising indicating an impending feedthrough seal failure using the compared parallel resistance value to a predefined parallel resistance value.

* * * * *